United States Patent
Giers

(10) Patent No.: US 6,877,823 B2
(45) Date of Patent: Apr. 12, 2005

(54) SYSTEM FOR CONNECTING A MOTOR VEHICLE CONTROLLER

(75) Inventor: Bernhard Giers, Frankfurt (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 10/275,406

(22) PCT Filed: Apr. 28, 2001

(86) PCT No.: PCT/EP01/04800
§ 371 (c)(1),
(2), (4) Date: Nov. 4, 2002

(87) PCT Pub. No.: WO01/85512
PCT Pub. Date: Nov. 15, 2001

(65) Prior Publication Data
US 2003/0151301 A1 Aug. 14, 2003

(30) Foreign Application Priority Data
May 10, 2000 (DE) .......................... 100 22 522
Aug. 30, 2000 (DE) .......................... 100 42 561

(51) Int. Cl.$^7$ .............................................. B60T 8/88
(52) U.S. Cl. ..................... 303/122.03; 303/191; 303/11
(58) Field of Search ..................... 303/10, 11, 122.09, 303/191, 122.02, 122.03, 122.08

(56) References Cited

U.S. PATENT DOCUMENTS

| 4,699,435 | A | * | 10/1987 | Wupper ......................... 303/11 |
| 5,000,520 | A | * | 3/1991 | Schmitt ......................... 303/10 |
| 5,411,324 | A | * | 5/1995 | Zydek et al. .......... 303/122.05 |
| 5,483,517 | A | * | 1/1996 | Kurata et al. ................ 370/241 |
| 5,779,327 | A | | 7/1998 | Nakashima et al. |
| 6,172,643 | B1 | * | 1/2001 | Toedter ....................... 342/417 |
| 6,224,168 | B1 | * | 5/2001 | Yamada .......................... 303/3 |

FOREIGN PATENT DOCUMENTS

| DE | 3227265 | 1/1984 |
| DE | 3234630 | 3/1984 |
| DE | 3724926 | 2/1989 |
| DE | 3816080 | 11/1989 |
| DE | 3833473 | 4/1990 |
| DE | 4425485 | 1/1995 |
| DE | 4436372 | 4/1996 |
| DE | 19814288 | 10/1998 |
| DE | 19910358 | 9/1999 |
| DE | 19822919 | 11/1999 |
| DE | 3913113 | 12/1999 |
| WO | 99/50098 | 10/1999 |
| WO | WO 9950098 A1 * 10/1999 ........... B60R/16/02 |

OTHER PUBLICATIONS

Elektronik Apr. 2000, pp. 50–56: 'Vernetzung im Kraftfahrzeug' 'Intelligente hochintegrierte Halbleiter unterstützen neue Automobilkonzepte' by Burkhard Kuhls, Francesco Colandrea, Peter Heinrich.

* cited by examiner

Primary Examiner—Robert A. Siconolfi
(74) Attorney, Agent, or Firm—Honigman, Miller, Schwartz and Cohn LLP

(57) ABSTRACT

The present invention describes an electronic circuit arrangement with a motor vehicle control adapted to be activated by a current/voltage supply, wherein the motor vehicle control or the current/voltage supply for the motor vehicle control is connected to an activation unit for the independent activation of the motor vehicle control, and the motor vehicle control can be switched on or off by the activation unit, and it also describes the use thereof for the control and/or monitoring of electronic or electrohydraulic brake systems. Also described is a system wherein leakage of a pressure reservoir is monitored and the pressure reservoir is replenished by means of a filling device as soon as the pressure drops below a defined limit value during the temporally limited activation.

8 Claims, 1 Drawing Sheet

SYSTEM FOR CONNECTING A MOTOR VEHICLE CONTROLLER

TECHNICAL FIELD

The present invention generally relates to vehicle controllers and more particularly relates to a system of activating electric vehicle controllers.

BACKGROUND OF THE INVENTION

In electronic systems for controlling the brake force (ABS) or for influencing/checking the driving stability (ESP, TCS), it is common to employ a unit for controlling/regulating and information processing that is connected to sensors and actuators of most various types, such as wheel speed sensors, filling level sensors, electromagnetic hydraulic valves, relays, and like components.

When the motor vehicle is switched off, e.g. when being parked, the electronic system will switch off immediately or, optionally, a certain time after switch-off of the vehicle; however, while the electronic system is deactivated, the vehicle condition will generally change. For example, the pressure in a hydraulic reservoir is likely to drop in the inactive state of the vehicle. Therefore, the current state of the vehicle is unknown to the electronic system shortly after the activation of the electronic system. Consequently, it is impossible to poll the vehicle condition when the controller is deactivated without having activated the controller before].

It is even impossible to overcome this problem by providing non-volatile memories such as Flash ROMs, instead of volatile memories such as dynamic or static RAMS, to store data about the vehicle state, because the data about the vehicle state cannot be updated when the electronic system is switched off.

If, for example in a motor vehicle equipped with an electrohydraulic brake (EHB), the objective is to monitor the filling level of the hydraulic accumulator that pertains to the EHB, this is not easily accomplished with prior art electronic controllers that switch off constantly. Especially long-term effects, such as the reduction of the pressure in the said hydraulic accumulator due to a slight leakage of the pressure reservoir or the supply lines, are impossible to monitor. When the pressure of the hydraulic reservoir in an EHB brake system drops below a defined value, the pressure is required to be re-increased by means of a pressure increase device (pump) in order that the full brake pressure is available again, if possible, directly after a brake operation is triggered by the driver. When a motor vehicle with EHB has been inactive for a long period of time, the electronic system will only be able to detect a pressure drop in the hydraulic reservoir when the driver starts the vehicle. However, the full pressure will not yet be available in the hydraulic reservoir at this moment. The consequential risk is that the brake system is not ready for operation immediately after release of the parking brake.

Activation of the electronic system over a length of time is, however, disadvantageous, in various respects. Thus, the permanent operation may e.g. cause high power consumption, a permanent heating, or an excessive stress of the electronic components.

BRIEF SUMMARY OF THE INVENTION

In view of the above, an object of the present invention is to improve the above-described prior art electronic circuit arrangements for controlling motor vehicles, in particular motor vehicle brakes, to the end that the control and the device actuated by the control will be available in full extent directly after the switch-on.

According to the present invention, this object is achieved by a circuit arrangement with a motor vehicle control adapted to be activated by a current/voltage supply, wherein the motor vehicle control or the current/voltage supply for the motor vehicle control is connected to an activation unit for the independent activation of the motor vehicle control, and the motor vehicle control can be switched on or off by the activation unit.

The electronic circuit arrangement according to the present invention comprises a motor vehicle control that is adapted to be activated by means of a current/voltage supply. The motor vehicle control is, for example, a partly electronically and electromechanically designed controller for an electrohydraulic brake system (EHB) which is preferably provided for the control and information processing in brake or drive systems. Therefore, it comprises at least one microprocessor in particular. Besides, there is provision of sensor inputs and control outputs for actuators in general.

The electronic circuit arrangement according to the present invention permits performing and detecting a measurement of the pressure drop in a hydraulic reservoir by monitoring the vehicle state, especially the signal of a pressure-measuring element at the hydraulic reservoir of the EHB, for a long period of time.

The activation unit is able to switch the motor vehicle control on or off in regular or irregular intervals. Preferably, the activation unit is configured as an electronic clock module, an electronic calendar module, or a module with at least one digital counter.

The activation unit is appropriately permanently connected to the current supply of a vehicle in a fashion that cannot be interrupted by the driver in particular, or it decides independently about the separation of the current supply after the switch-on. In a particularly preferred manner, the switching element for separation from the voltage supply does not exist in the circuit arrangement of the present invention.

It is also expedient that the activation unit is so configured that time intervals can be predefined in which the activation unit switches the motor vehicle control on.

Also, it is expedient that the time intervals can be predefined or programmed, respectively, by the motor vehicle control, e.g., by way of a connecting line.

Preferably, the activation unit comprises a time module. The time determined in the time module or, respectively, the calendar in general in which it is fixed when a wake-up of the controller shall take place may be invariably predetermined by the time module or may be programmed by the computer system, what is preferred. In the case mentioned the last the measuring intervals may in addition be adapted dynamically to the gradient of the test signal in particular. When, for example, the gradient of the test signal is high, measurements may occur more frequently than with a low gradient of the test signal.

Upon expiry of a time period, the system is switched on for a short time for measuring, monitoring, or activating actuators. For example, current limits for the rest current (standby) of 500 μamps may be achieved at low cost, i.e., with a small number of additional components.

The activation unit advantageously has a low energy requirement. Therefore, it consumes a current of less than 1 milliamp, especially less than 600 μamps, in a particularly preferred manner.

The circuit arrangement then advantageously meets the high requirements with respect to the average rest current consumption that are placed on an electronic controller in modern motor vehicles.

The present invention also relates to the implementation of the above-described circuit arrangement for the control and/or monitoring of electronic or electrohydraulic brake systems, in particular electrohydraulic brake systems.

Further, the present invention relates to a system for monitoring measured variables, in particular for monitoring the pressure in a hydraulic reservoir of an electronic brake system and, in a particularly preferred manner, an electrohydraulic brake system, with a circuit arrangement as described above, wherein the motor vehicle control is switched off to save energy and the activation unit activates the motor vehicle control after switch-off in a temporally limited way for monitoring the measured variables.

According to the present invention, a circuit arrangement as described hereinabove is used to monitor measured variables, in particular, the pressure in a hydraulic reservoir of an electronic brake system is monitored. In a particularly preferred manner, an electrohydraulic brake system is monitored.

The motor vehicle control is switched off for energy economy purposes according to the system. The activation unit will then activate the motor vehicle control after switch-off in a temporally limited manner in periodic or aperiodic intervals. This provision permits monitoring the measured variables.

Monitoring the measured variables usually achieves test results that must be evaluated at a later point of time. The test results get lost when the motor vehicle control is switched off. Also, it is disadvantageous that no intermediate results are available for the switch-off period.

Therefore, the measured variables may advantageously be stored in a non-volatile memory.

In addition, the effects of pressure loss in the hydraulic reservoir as mentioned in the above example of the electrohydraulic brake (EHB) may be compensated. This not only permits detecting the hydraulic accumulator leakage but also quantizing and compensating it e.g. by way of the periodic switch-on of a charging pump.

This arrangement is favorable because it obviates the need for a mechanic or electronic device directly at the reservoir used to switch on a pressure increase means in response to pressure monitoring. It further eliminates the need for a cost-intensive electric substitute circuit that would have to satisfy the strict demands placed on the rest current.

Advantageously, the system is used to monitor the leakage of a pressure reservoir, and the pressure reservoir is replenished by a filling device as soon as the pressure drops below a defined limit value during the temporally limited activation.

The present invention makes it possible to take a measurement of e.g. a hydraulic accumulator leakage for a long period, thereby permitting the measurement of aging effects of the system in particular, while also allowing specific maintenance work to be performed before the driver switches on the controller. Beside cost reduction, the additional result is greater availability and/or safety of the components actuated by means of the controller.

In a fashion also preferred in the present invention, likewise the charging condition of an electric energy accumulator may be monitored by the system, especially the voltage of an accumulator, e.g. that of an electromechanic brake (EMB).

Favorable embodiments can be seen in the sub claims and the following description of the Figures.

DETAILED DESCRIPTION OF THE PREFERRED EMBODIMENTS

Figure 1:
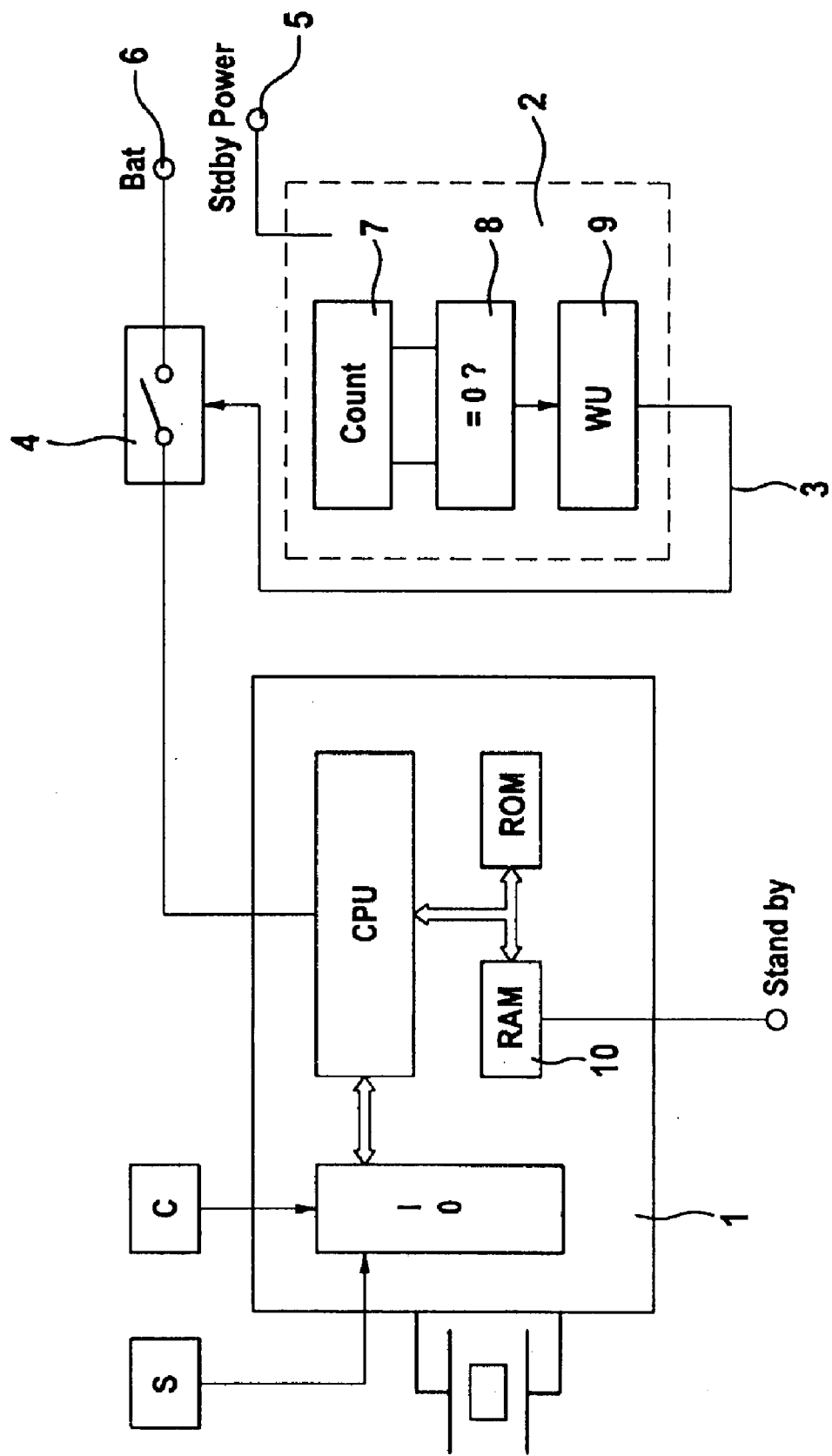
FIG. 1 shows an example of a circuit arrangement of the present invention.

In the embodiment of FIG. 1, the controller 1 along with a microprocessor processing a control algorithm evaluates input signals from sensors S and actuates the actuators C in dependence on the result of the sensor evaluation. A module for measuring the time 2 is connected to the current/voltage supply 6 of the controller or to the controller itself, the module including a separate current/voltage supply 5 which still exists even if the current/voltage supply of the controller is switched off by way of the switch 4 or if said controller switches itself off.

The module for measuring the time 2 may be realized in different ways. The module may e.g. be configured as a clock module of a per se known type of construction, or as an electronic circuit arrangement generally formed of digital counters 7. Advantageously, the time measuring module is distinguished by a low current consumption. A high rate of accuracy at low cost may be achieved with this component due to the fact that only few components are required. In case the time measuring module is comprised of digital counters, its design may preferably be in a simple manner such that an oscillator is connected with a counter 'Count' that counts forwards or backwards. When the counter is operated in such a way that it counts backwards, the counter's content may be compared to the value zero by means of a comparing element 8. Suitably, the counter can be connected to a circuit element 9 (Wake Unit WU) for actuating the current supply switch 4.

By way of an output 3 of the real time measuring module being continuously supplied with energy via line 5, the possibly disconnected controller is re-connected (woken up) to the current/voltage supply after a defined length of time, enabling it to take measurements, e.g. a measurement of the accumulator leakage, in dependence on periods that can be predetermined by the time count unit.

When a time measuring module as described hereinabove is used, a considerably lower amount of energy is drained from an energy supply (not shown) by way of the current/voltage supply 5 than is the case with the current/voltage supply 6 when the consumer 1 is switched on.

What is claimed is:
1. Electronic circuit arrangement, comprising:
an electrohydraulic brake system including a motor vehicle controller adapted to be activated by a current/voltage supply,
an activation unit for the independent activation, and absent interruption by the driver, of the motor vehicle controller, and wherein the motor vehicle control is switched to an on or off state by the activation unit in dependence on time periods that are predetermined by at least one of an electronic clock module, an electronic calendar module, or a timer module with at least one digital counter within the activation unit,
and wherein a pressure reservoir is selectively replenished during a predetermined time period by a filling device when the motor vehicle control is switched to an on state.

2. Circuit arrangement as claimed in claim 1, wherein the activation unit is permanently connected to the current supply of a vehicle or determines its separation from the timing of the current supply.

3. Circuit arrangement as claimed in claim 1, wherein said electronic clock module, electronic calendar module, or said timer module includes means for predefining time intervals for the activation unit in which the activation unit switches the motor vehicle controller to an on state.

4. Circuit arrangement as claimed in claim 3, wherein that the time intervals can be predefined or programmed, by the motor vehicle control.

5. Circuit arrangement as claimed in claim 1, wherein said activation unit consumes less than 1 milliamp.

6. Circuit arrangement as claimed in claim 5, wherein said activation unit consumers less than 600 $\mu$amps.

7. A system for monitoring measured variables, comprising:

an electrohydraulic brake system having an electronic circuit connected to a motor vehicle control adapted to be activated by a current/voltage supply, wherein the motor vehicle control or the current/voltage supply for the motor vehicle control is connected to an activation unit for the independent activation, and absent interruption by the driver, of the motor vehicle control, and wherein the motor vehicle control is switched to an on state or an off state by the activation unit, wherein the motor vehicle control is switched to an off state to save energy and wherein the activation unit switches said motor vehicle control to an on state for a predetermined period of time in dependence on a time period that is determined by a timer module within the activation unit wherein the measured variables are stored in a non-volatile memory for the purpose of monitoring the measured variables and wherein one of the monitored variables includes the leakage of a pressure reservoir, and the pressure reservoir is replenished during a predetermined time period by a filling device as soon as the pressure drops below a defined limit value.

8. System as claimed in claim 7, wherein one of the monitored variables includes the leakage of a pressure reservoir, and the pressure reservoir is replenished during a predetermined time period by a filling device as soon as the pressure drops below a defined limit value.

* * * * *